United States Patent [19]

Keck

[11] Patent Number: 4,529,078
[45] Date of Patent: Jul. 16, 1985

[54] CLUTCH DISC

[75] Inventor: Karl Keck, Leutesheim, Fed. Rep. of Germany

[73] Assignee: Luk Lamellen und Kupplungsbau GmbH, Bühl, Fed. Rep. of Germany

[21] Appl. No.: 331,927

[22] Filed: Dec. 17, 1981

[30] Foreign Application Priority Data

Dec. 19, 1980 [DE] Fed. Rep. of Germany ....... 3047934

[51] Int. Cl.³ ............... F16D 69/04; F16D 13/68; F16D 13/72
[52] U.S. Cl. ............... 192/107 C; 192/70.12; 192/103 A
[58] Field of Search ............. 192/70.12, 113 A, 107 C; 188/261, 250 E, 264 A, 264 AA

[56] References Cited

U.S. PATENT DOCUMENTS

| | | | |
|---|---|---|---|
| 1,652,007 | 12/1927 | Gamble | 192/107 C |
| 1,992,626 | 2/1935 | Nutt | 192/107 C |
| 2,566,394 | 9/1951 | Zeidler | 192/107 C |
| 2,597,911 | 5/1952 | Thelander | 192/107 C |
| 2,888,122 | 5/1959 | Garmager | 192/107 C |
| 3,301,356 | 1/1967 | Pompa | 192/107 C |
| 3,425,524 | 2/1969 | Dewar | 188/264 AA |
| 4,260,048 | 4/1981 | Beccaris | 192/107 C |

FOREIGN PATENT DOCUMENTS

| | | | |
|---|---|---|---|
| 7149592 | 9/1973 | Fed. Rep. of Germany . | |
| 2398932 | 7/1977 | France | 192/107 R |
| 2019959 | 11/1979 | United Kingdom . | |

Primary Examiner—Rodney H. Bonck
Attorney, Agent, or Firm—Peter K. Kontler

[57] ABSTRACT

A clutch friction disc or plate wherein a circular flange carries a set of equidistant blades each extending radially outwardly beyond its periphery and each having a pair of overlapping, elastic plates whose inner end portions are riveted to the flange. A friction lining is connected with the outer side of each plate by two rivets whose heads extend into complementary circular openings provided in the other plate of the respective pair. At least one opening of each plate communicates with at least one slot end of which communicates with the respective opening and the other end of which is closed, open by extending to the marginal portion of the respective plate, or communicates with the other opening in the respective plate. The slots reduce the likelihood of distortion of plates as a result of development of unequal stresses owing to unequal heating of all regions of the plates when the disc is engaged between a pair of torque-transmitting or torque-receiving elements of the clutch.

20 Claims, 8 Drawing Figures

CLUTCH DISC

CROSS-REFERENCE TO RELATED APPLICATION

The clutch disc of the present invention is similar to that disclosed in my commonly owned copending application Ser. No. 331,935, filed on even date for "Clutch Friction Plate", now abandoned.

BACKGROUND OF THE INVENTION

The present invention relates to friction clutches in general, and more particularly to improvements in so-called clutch friction discs which are utilized in many types of clutches to transmit torque between driving and driven rotary components, e.g., in clutches for automotive vehicles to transmit torque from a crankshaft to the input element of a change-speed transmission. Still more particularly, the invention relates to improvements in clutch friction discs of the type wherein a rotary flange carries at least one blade which extends radially beyond the periphery of the flange and is assembled of two elastically deformable plates carrying friction linings of metallic, ceramic or other suitable material.

It is already known to provide the flange of a clutch friction disc with a plurality of radially outwardly extending blades each of which has two plates facing each other and carrying, at their outer sides, friction linings which are permanently affixed thereto by rivets. It is also known to provide each plate of each blade with an opening for the inner head of each rivet which connects the associated plate with the corresponding friction lining as well as with a rivet hole for the shank or neck of the rivet connecting the plate with its associated lining. Reference may be had to U.S. Pat. No. 1,652,007 granted Dec. 6, 1927 to Gamble. This patent discloses circumferentially complete friction rings at the outer sides of the plates and also the feature that one of the plates has a radially bowed portion enabling the clutch friction disc to yield when the clutch is engaged.

British Pat. No. 2,019,959 discloses a modified clutch friction disc with a central hub or flange for several blades each including two elastically deformable plates provided with friction linings which are secured thereto by rivets. The lateral portions of plates in each blade are coupled to each other by lugs whose bent-over end portions extend into complementary recesses of the neighboring plates. The median portions of the plates in each blade tend to move apart, i.e., the thickness of each blade increases when the clutch is disengaged. The inner heads of rivets which connect the linings to the respective plates penetrate into the openings of neighboring plates when the blades are flattened so that the rivets do not interfere with a reduction of the thickness of blades in engaged condition of the clutch.

German Utility Model No. 7,149,592 discloses a further clutch friction disc which also utilizes friction linings at the outer sides of plates forming part of blades at the periphery of a disc-shaped carrier or flange. The friction linings are installed in sockets which are mounted on the plates. Specially designed rivets are provided to secure the sockets to the respective plates as well as to limit the extent of movement of the plates in a blade away from each other.

In each friction disc, the plates which carry the friction linings are subjected to very pronounced thermal stresses which can result in localized overheating and can entail permanent deformation of corresponding portions of the plates. The extent of permanent deformation depends on the magnitude of internal stresses and can be sufficient to prevent satisfactory operation of the clutch, i.e., the friction disc is not likely to be properly separated from the neighboring component parts when the operator wishes to disengage the clutch. In such instances, the operator must exert a substantial force whenever he or she wishes to shift into a different gear, and the application of such force can lead to extensive damage to the clutch and/or to the transmission which receives torque from the engine in response to engagement of the clutch when the latter is used in an automotive vehicle.

OBJECTS AND SUMMARY OF THE INVENTION

An object of the invention is to provide a novel and improved clutch friction plate or disc which is less likely to undergo excessive and/or permanent deformation than heretofore known clutch discs.

Another object of the invention is to provide a clutch friction disc which can stand high or very high thermal stresses with greatly reduced likelihood of temporary or permanent damage to or deformation of its component parts than in heretofore clutch discs.

A further object of the invention is to provide a clutch friction disc with novel and improved means for preventing warping and/or other damage to component parts which support the friction linings.

An additional object of the invention is to provide a novel and improved clutch friction disc whose useful life greatly exceeds that of heretofore known clutch discs and which can be used in known clutches as a superior substitute for presently employed clutch friction discs.

Still another object of the invention is to provide a clutch friction disc which is more reliable than conventional clutch discs and whose initial cost need not exceed and can actually be much less than that of presently known clutch friction discs.

An ancillary object of the invention is to provide a clutch friction disc which can be readily assembled in available automatic machines and can be taken apart, if desired, in order to allow for convenient inspection and/or replacement of certain component parts.

Another object of the invention is to provide a clutch friction disc which is constructed and assembled in such a way that the extent to which it can stand thermal and/or other stresses can be selected as a function of the magnitude of anticipated stresses.

The invention resides in the provision of a clutch friction disc or plate which comprises a rotary flange and a plurality of blades extending substantially radially from and being integrally or detachably secured (e.g., riveted) to the flange. Each blade comprises a pair of associated elastically deformable overlapping plates having inner sides facing each other and outer sides, friction linings provided at the outer sides of the plates, and rivets connecting the linings to the respective plates. Each plate has an opening for each rivet connecting the associated plate with the respective lining and at least one plate of each pair has at least one slot communicating with the single opening or at least one opening of such plate. Each plate of each pair of plates can have at least one slot which communicates with at least one opening of the corresponding plate, and each plate can have a plurality of openings and at least one slot in each of the plates can have an open end which is remote from the respective opening, i.e., the open ends of such slots can terminate in the marginal portions of the respective plates.

If a plate has two openings, the slot in such plate (or one of the slots in such plate) can connect the openings with each other; for example, and if the openings are circular openings which have portions that are nearest to each other, the slot can connect such nearest portions of the openings to one another. The just discussed slot can have at least one extension projecting beyond at least one of the respective openings, i.e., the slot can extend substantially diametrically of one of the openings or of both openings between which such slot extends.

If a plate has several openings, a slot in such plate can constitute a U-shaped slot whose web is nearer to the axis of the flange than the respective openings and each leg of which communicates with a different one of the openings in the corresponding plate. The just discussed plate can have a rivet hole which is surrounded by the U-shaped slot, i.e, the rivet hole (for the shank of a rivet which connects such plate to the corresponding friction lining) can be located in the space three sides of which are surrounded by the web and by the two legs of the U-shaped slot.

Each slot can extend substantially radially of the respective opening, and each slot can have an open end communicating with the respective opening and a closed end.

At least one of the plates can have several slots communicating with one and the same opening. Also, the slot can constitute a substantially H-shaped slot whose central portion connects two openings in the respective plate and the remaining portions of which are disposed in pairs at the opposite sides of a symmetry plane including the centers of the two openings and normal to the plane of the respective plate.

At least one slot in at least one of the plates can be inclined with reference to a plane including the axis of the flange and the center of the opening from which the slot extends. Such slot can extend outwardly, i.e., away from the axis of the flange, and can have an open end in the radially outermost marginal portion of the respective plate.

The friction linings on the plates of each pair of plates can be angularly offset with reference to each other, e.g., through 90 degrees, and each lining can be connected to the corresponding plate by a pair of rivets. Such rivets can form an annulus about the periphery of the flange or they can form two or more annuli including an inner annulus and an outer annulus. In other words, the plane including the axes of two or more rivets connecting a lining to the respective plate can be substantially tangential to the periphery of the flange, or it may extend radially of and may include the axis of the flange.

The novel features which are considered as characteristic of the invention are set forth in particular in the appended claims. The improved clutch friction disc itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
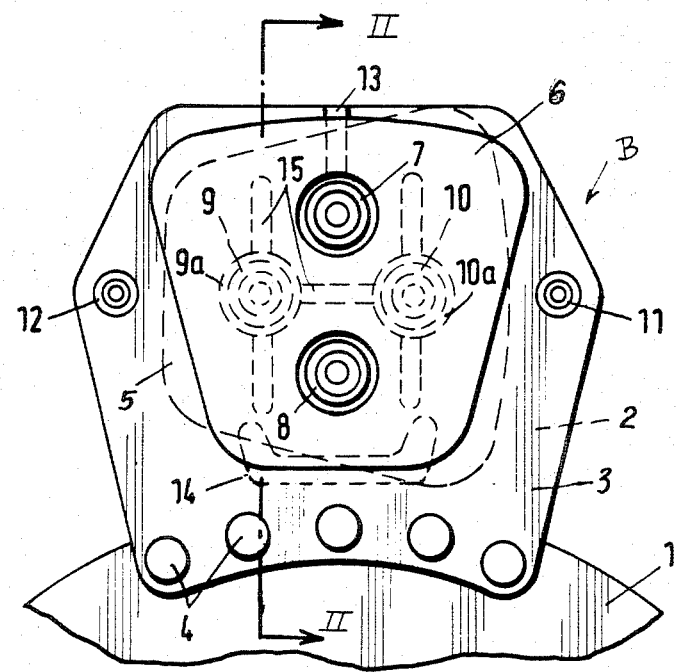
FIG. 1 is a fragmentary elevational view of a clutch friction disc which embodies one form of the invention.
Figure 2:
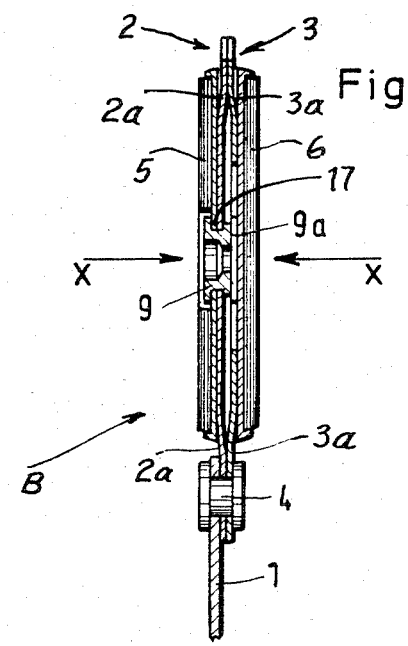
FIG. 2 is a sectional view as seen in the direction of arrows from the line II—II of FIG. 1.

Referring first to FIGS. 1 and 2, there is shown a clutch friction disc or plate including a rotary disc-shaped hub plate or flange 1 which can be non-rotatably secured to a torque-transmitting or torque-receiving element of an automotive vehicle. The flange 1 can be directly or indirectly connected with the hub of a clutch plate. The indirect connection can comprise one or more damping springs (not shown) of conventional design.

Figure 3:
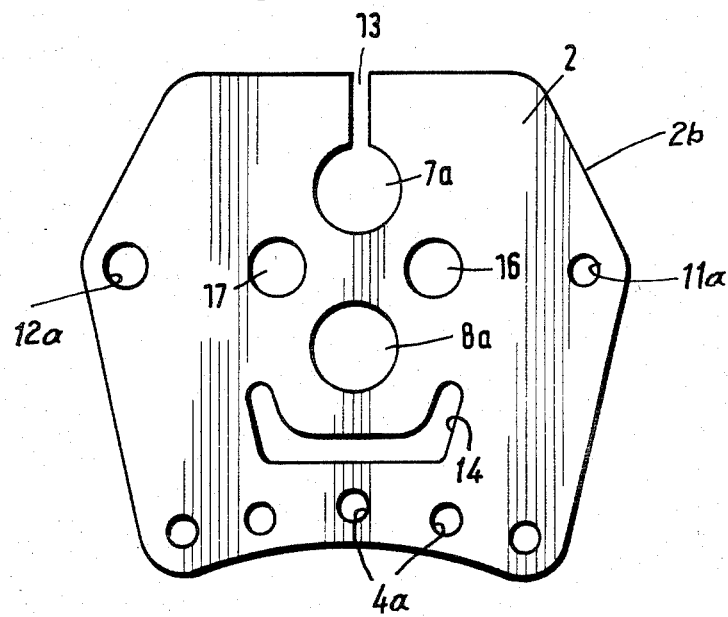
FIG. 3 is an elevational view of one of the plates in the blade which is shown in FIGS. 1 and 2.
Figure 4:
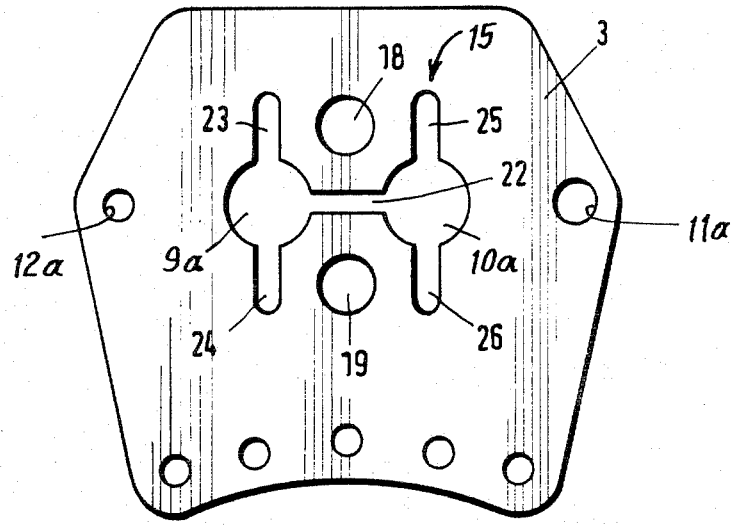
FIG. 4 is a similar view of the other plate of the pair of plates forming the blade shown in FIGS. 1 and 2.

The flange 1 carries an annulus of equidistant wings or blades B (only one shown) each of which includes two mirror symmetrical elastically deformable plates 2, 3 secured to the marginal portion of the flange 1 by a set of five rivets 4 or analogous fastener means. For example, the flange 1 can carry four, six or eight equidistant blades B, as considered in the circumferential direction of the flange. The inner sides of the elastically deformable plates 2, 3 in each blade B face each other, and the outer sides of such plates are respectively adjacent to discrete plate-like friction linings 5, 6 each of which is secured to the corresponding plate by two rivets. The rivets 9 and 10 connect the lining 5 to the plate 2, and the rivets 7, 8 connect the lining 6 to the plate 3. The line connecting the axes of the rivets 7, 8 extends radially of the flange 1, and the line connecting the axes of the rivets 9, 10 extends substantially tangentially of the periphery of the flange 1. As shown in FIG. 3, the plate 2 has two circular openings 7a, 8a for the inner heads of the rivets 7, 8, and two rivet holes 16, 17 for the shanks of the rivets 9, 10. Analogously, and as shown in FIG. 4, the plate 3 has two circular openings 9a, 10a for the inner heads of the rivets 9, 10 and two rivet holes 18, 19 for the shanks of the rivets 7, 8. FIG. 2 shows that the outer head of the rivet 9 is substantially flush with the exposed side of the friction lining 6, that the inner head of the rivet 9 extends into the opening 9a of the plate 3 and that the shank of the rivet 9 extends through the hole 17 of the plate 2. The mounting of the rivets 7, 8 and 10 is analogous. By way of example, the outer head of the rivet 7 is received in the opening of the lining 6 and is flush with the outer side of such lining, the inner head of the rivet 7 is received in the opening 7a of the plate 2, and the shank of the rivet 7 extends through the hole 18 of the plate 3.

The friction lining 5 is turned through 90 degrees with reference to the friction lining 6 (see FIG. 1). These linings are flanked by two additional rivets 11, 12 which connect the corresponding portions of the plates 2, 3 to each other and whose shanks extend through holes 11a, 12a provided in the corresponding portions of the plates 2 and 3 (see FIGS. 3 and 4). FIG. 1 further shows that the lines connecting the axes of the rivets 7, 8 on the one hand and the axes of the rivets 9, 10 on the other hand form a cross substantially in the central portions of those parts of the plates 2, 3 which extend radially outwardly beyond the periphery of the flange 1. The inner heads of the rivets 7-10 need not permanently extend into the respective openings 7a, 8a, 9a, 10a. However, when the respective blade B is flattened between two torque-transmitting or torque-receiving elements of a clutch, the inner heads of the rivets 7 to 10 will or can enter the respective openings 7a-10a in response to some or pronounced elastic deformation (flattening) of the plates 2 and 3. FIG. 2 shows that the plates 2 and 3 have bent portions 2a, 3a in the region of the rivets 4 as well as in the region of the radially outermost part of the blade B so that the central parts of the two plates are normally spaced apart from each other but can yield by moving toward each other in response to the application of stresses to the outer sides of the friction linings 5 and 6 (see the arrows X in FIG. 2). The bent portions 2a and 3a of the plates 2 and 3 are preferably mirror symmetrical to each other with reference to a plane extending between the two plates of a blade B. The portions 2a, 3a enable each blade B to yield or "give", as considered in the axial direction of the clutch friction disc. As mentioned above, the inner heads of the rivets 7 to 10 will penetrate or can penetrate into the adjacent openings 7a to 10a in response to the application of axial stresses (arrows X) to thereby ensure that the outer sides of the linings 5 and 6 will lie flat against the surfaces of adjacent torque-transmitting or torque-receiving elements (not shown) in a friction clutch. FIG. 1 shows that the linings 5 and 6 have a trapezoidal outline; however it will be appreciated that the improved clutch friction disc can use circular, square or otherwise configurated linings with equal advantage.

In accordance with a feature of the invention, at least one plate 2 or 3 of each blade B is formed with at least one slot which communicates with at least one of the respective openings. In addition, at least one plate of each pair of plates 2, 3 can have one or more additional slots or cutouts which need not communicate with the respective opening or openings. FIG. 3 shows that the plate 2 has an elongated straight slot 13 one open end of which communicates with the outer opening 7a (for the inner head of the rivet 7) and which has a second open end in the radially outermost part of the marginal portion 2b of the plate 2. A substantially C-shaped or U-shaped closed slot or cutout 14 is provided in the plate 2 in the space between the opening 8a and the holes 4a for the respective rivets 4. The cutout 14 includes two halves which are preferably mirror symmetrical to each other with reference to a plane including the axis of the flange 1 and the centers of the openings 7a, 8a. The purpose of the slot 13 and cutout 14 is to reduce the likelihood of or prevent thermally induced damage to the plate 2 when the clutch friction disc including the structure of FIGS. 1 to 4 is in actual use. For example, in the absence of the slot 13 and/or cutout 14, the plate 2 could be subjected to pronounced twisting or warping stresses of such magnitude that it would be unable to recover and reassume its optimum shape upon termination of the thermally induced stresses.

The plate 3 has a substantially H-shaped slot 15 which communicates with the openings 9a, 10a and includes a central portion 22 connecting those portions of the circular openings 9a, 10a which are nearest to each other and two pairs of radially extending portions 23, 24 and 25, 26 which are mirror symmetrical to each other with reference to a plane including the axes of rivets extending into the holes 9a, 10a and halving the central portion 22. It will be noted that each of the openings 9a, 10a communicates with a total of three elongated slots, i.e., the opening 9a communicates with the slots 22-24 and the opening 10a communicates with the slots 22, 25, 26.

Each of the plates shown in FIGS. 5, 6, 7 and 8 can be used in lieu of the plate 2 and/or 3, especially in lieu of the plate 3 shown in FIG. 4. Analogously to the plate 3, each of the plates shown in FIGS. 5 to 8 comprises two rivet holes 18, 19 and two circular openings 9a, 10a for the inner heads of the respective rivets 9 and 10.

Figure 5:
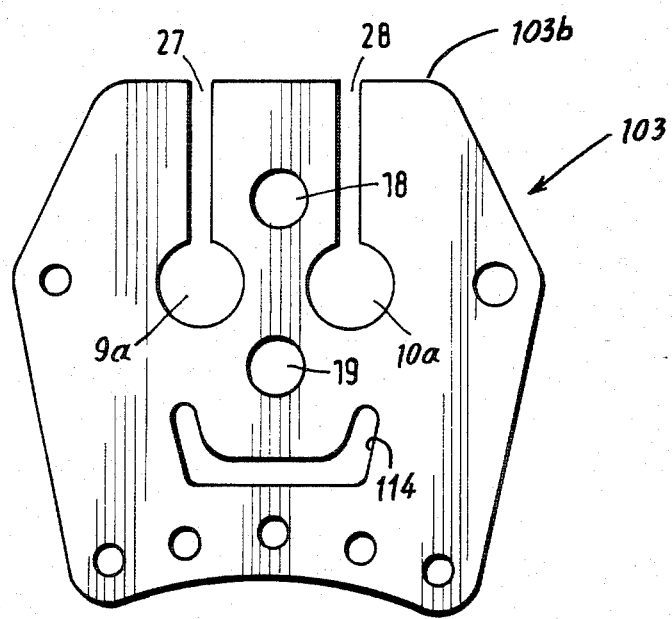
FIG. 5 is an elevational view of a modified plate.

Referring more specifically to the plate 103 of FIG. 5, the openings 9a, 10a respectively communicate with elongated slots 27, 28 whose open outer ends are located in the radially outermost part of the marginal portion 103b. Furthermore, the plate 103 has a cutout 114 similar to the cutout 14 in the plate 2 of FIG. 3.

Figure 6:
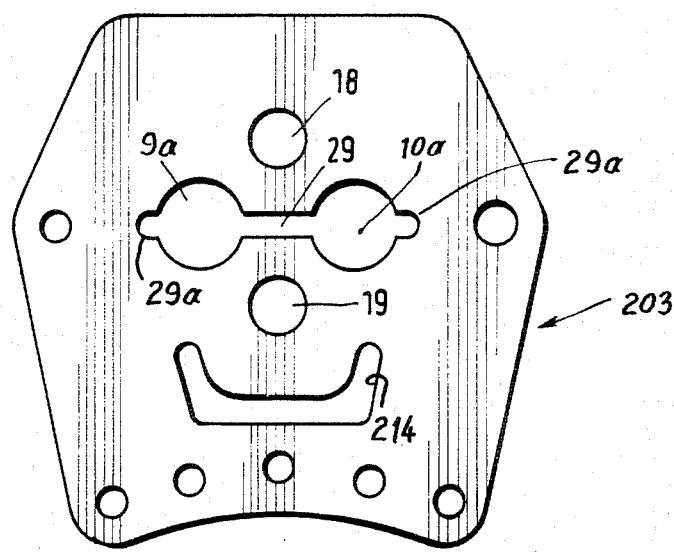
FIG. 6 is an elevational view of still another plate.

The plate 203 of FIG. 6 has a slot 29 which connects the nearest portions of the two circular openings 9a, 10a to each other and has two extensions 29a extending beyond the two openings. In other words, the slot 29 can be said to extend diametrically of the openings 9a and 10a and its overall length exceeds the distance between the openings 9a, 10a plus the diameters of such openings.

The cutout 214 in the plate 203 is analogous to the cutout 114 in the plate 103 of FIG. 5 or to the cutout 14 in the plate 2 of FIG. 3.

Figure 7:
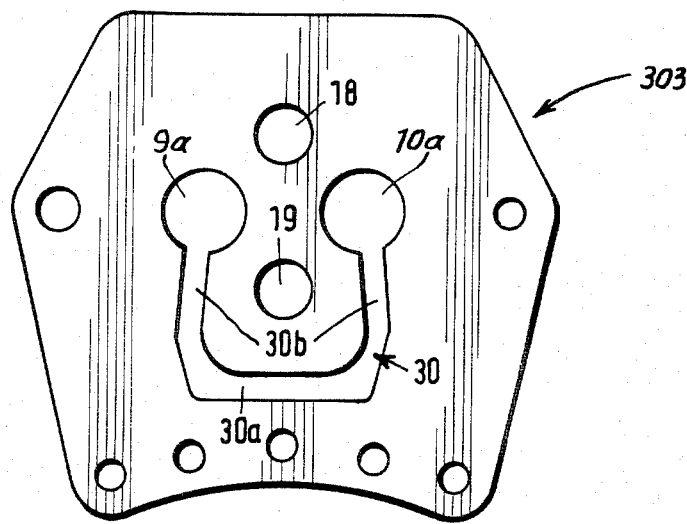
FIG. 7 is an elevational view of an additional plate.

The plate 303 of FIG. 7 has a substantially U-shaped slot 30 which connects the openings 9a and 10a to each other and has a web or central portion 30a located between the openings 9a, 10a and the axis of the respective flange (not shown) as well as two legs 30b which connect the respective end portions of the web 30a with the openings 9a and 10a. The rivet hole 19 is disposed within the confines of (i.e., it is substantially surrounded by) the U-shaped slot 30. The legs 30b can be said to extend substantially radially of the clutch friction disc which includes the plate 303.

Figure 8:
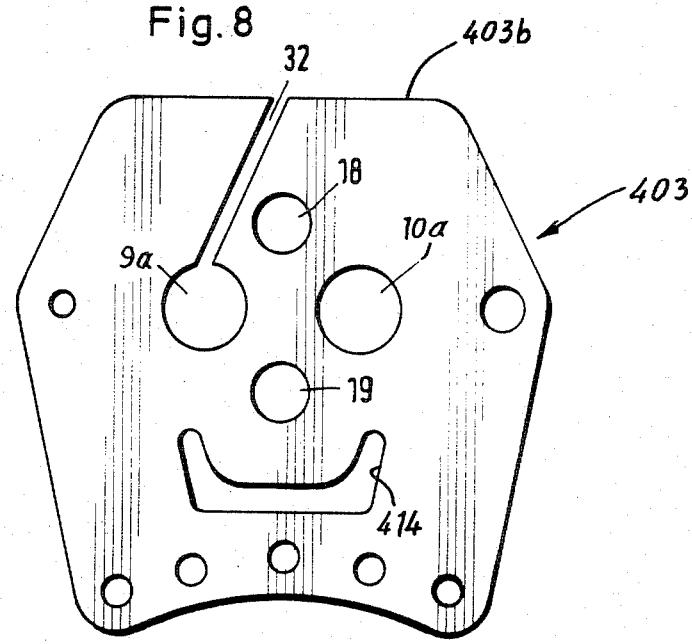
FIG. 8 is a similar elevational view of a further plate.

The plate 403 of FIG. 8 has an elongated inclined slot 32 which extends from the opening 9a to the outermost part of the marginal portion 403b of this plate and makes an acute angle with a line connecting the axis of the flange (not shown) with the center of the opening 9a. The closed slot or cutout 414 is analogous to the cutout 14, 114 or 214.

The improved clutch friction disc is susceptible of many additional modifications without departing from the spirit of the invention. For example, at least one of the plates which constitute a blade B can be made integral with the flange 1, i.e., one or both plates of some or all of the blades B can constitute radially outwardly extending integral wings or paddles of the flange. Furthermore, the distribution and/or the number of open and/or closed slots in the plates may be varied in a number of additional ways. All that counts is that at least one plate of each blade B be provided with at least one slot which preferably communicates with the single opening or with at least one opening of several openings in the respective plate.

The friction linings 5 and 6 may consist of a metallic or metallic-ceramic material. Depending on the dimensions of the linings, the number of rivets which connect such linings to the respective plates can be reduced to one or increased to three or even more.

Experiments with the improved clutch friction disc indicate that the plates which constitute the blades B and carry the friction linings are more likely to undergo pronounced deformation if their dimensions appreciably exceed the dimensions of the respective linings, i.e., if a plate extends well beyond the marginal portions of the respective lining, especially if the lining consists of a metallic material or of a combination of metallic and ceramic materials and the lining is riveted to the adjacent plate. The reason for such more pronounced deformation of the just discussed types of plates, whose dimensions greatly or appreciably exceed those of the friction linings thereon, is believed to be that, when a clutch using such a clutch friction disc is engaged, the plate portions which are overlapped by the adjacent friction linings are heated to a temperature which is much higher than the temperature of the non-overlapped portion or portions of the plate. This will be readily appreciated since the non-overlapped portions of the plates can be cooled by the surrounding atmospheric air but such air is incapable of penetrating into a blade B so as to cool those portions of the plates (such as 2 and 3) which are overlapped by the respective friction linings (5 and 6). The temperature differences between the overlapped and non-overlapped portions of the plates bring about the development of pronounced internal stresses, namely, stresses which can be very substantial in the border regions between the overlapped and non-overlapped plate portions. It has been found that the provision of one or more slots in one or both plates of each blade B greatly reduces the likelihood of development of excessive internal stresses and of the tendency of such plates to undergo warping, twisting and/or other types of long-lasting or permanent deformation.

The slot or slots in a plate (such as 2 or 3) can produce one or more beneficial effects. Thus, the slot or slots can be positioned and/or configurated in such a way that they effect at least some or even substantial separation of overlapped portions from non-overlapped portions of the plates. This reduces the tendency of the plates to warp and/or to undergo other types of deformation which is likely to adversely influence the operation of the clutch. In other words, the slots can be positioned and dimensioned in such a way that they prevent the transfer of heat from the more intensively heated overlapped portions to the less intensively heated non-overlapped portions of the plates, i.e., the slots act not unlike thermal insulators or barriers.

Secondly, or in addition to the just discussed insulating function, the slots in the plate or plates of a blade B can allow the respective plate or plates to "breathe" in its or their respective planes, i.e., they allow for thermally induced expansion of more intensively heated portions of the plates with reference to the less intensively heated portions so that the likelihood of warping and/or other types of undesirable deformation is greatly reduced or eliminated. In each instance, the slots either counteract or eliminate the development of unequal stresses in different portions of a plate or, at the very least, such slots reduce the deleterious effects of unequal stressing in different regions of one and the same plate.

It has been found that slots which are open at both ends and/or slots which connect pairs of openings in one and the same plate are particularly likely to contribute to a pronounced reduction of differences between thermally induced stresses in various portions of one and the same plate. Owing to the provision of slots in the plates of the improved blades, the equalization of stresses in those portions of plates which are overlapped by friction linings with stresses in the non-overlapped portions of the plates is so pronounced that the useful life of the improved clutch friction disc is incomparably longer than that of heretofore known clutch friction discs or plates employing blades with pairs of plates which are partially overlapped by metallic-ceramic friction linings.

It has further been found that the beneficial effect of the slots is also highly pronounced even if each slot is open only at one end, e.g., at that end which communicates with one of the openings in the respective plate. As explained in connection with FIG. 4, each of the openings (such as 9a and 10a) can communicate with a number of slots one or more of which terminate within the confines of the respective plate, i.e., which need not extend all the way to the marginal portion of the respective plate and at least some of which are closed at those ends which are remote from the respective openings.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch friction disc, comprising a rotary flange and a plurality of blades extending substantially radially from and secured to said flange, each of said blades comprising a pair of associated elastically deformable overlapping plates having inner sides facing each other and outer sides, friction linings provided at the outer sides of said plates, and rivets connecting said linings to the respective plates, each of said rivets having a projection at the inner side of the respective plate and each of said plates having an opening into which the projection of the rivet connecting the associated plate with the respective lining can extend and at least one plate of each pair having at least one slot communicating with the opening of such one plate.

2. The disc of claim 1, wherein each plate of each of said pairs has at least one slot communicating with the opening in the respective plate.

3. The disc of claim 2, wherein each of said plates has a plurality of openings.

4. The disc of claim 1, wherein the slot of at least one of said plates has an open end remote from the respective opening.

5. The disc of claim 4, wherein each of said plates has a marginal portion and the open end of the slot in said one plate is disposed in the respective marginal portion.

6. The disc of claim 1, wherein at least one plate of at least one of said pairs has two openings and the one plate of said one pair has a slot connecting the respective openings.

7. The disc of claim 6, wherein said openings in the one plate of said one pair have portions located nearest to each other and the respective slot connects such portions of the respective openings to each other.

8. The disc of claim 6, wherein the slot connecting said openings of the one plate of said one pair of plates has at least one extension projecting beyond one of the respective openings.

9. The disc of claim 6, wherein the slot connecting the openings of the one plate of said one pair is a substantially U-shaped slot.

10. The disc of claim 9, wherein the one plate of said one pair of plates has a rivet hole spacedly surrounded by said U-shaped slot.

11. The disc of claim 9, wherein said U-shaped slot has a web located radially inwardly of the respective openings with reference to the axis of rotation of said flange and two legs each connecting said web with a different one of the respective openings.

12. The disc of claim 1, wherein said openings are substantially circular openings and each slot extends substantially radially of the respective opening.

13. The disc of claim 12, wherein each of said slots has an open end communicating with the respective opening and a closed end.

14. The disc of claim 1, wherein at least one of said plates has several slots communicating with one and the same opening.

15. The disc of claim 1, wherein at least one plate of at least one of said pairs has two openings, a first slot connecting said openings and at least one pair of additional slots disposed at the opposite sides of said first slot.

16. The disc of claim 15, wherein said additional slots are substantially mirror symmetrical to each other with reference to a plane including the centers of the openings in the one plate of said one pair.

17. The disc of claim 1, wherein at least one plate of at least one of said pairs has two openings and a substantially H-shaped slot communicating with both openings in the respective plate.

18. The disc of claim 17, wherein said H-shaped slot has a central portion extending between the respective openings.

19. The disc of claim 1, wherein the friction lining at the outer side of one plate of each pair is angularly offset with reference to the lining at the outer side of the other plate of the respective pair of plates.

20. The disc of claim 1, wherein said slot is an elongated slot having a first open end communicating with the respective opening and a second open end remote from the respective opening, said slot being inclined with reference to a plane including the axis of said flange and the center of the opening which communicates with said elongated slot.

* * * * *